US012709392B2

(12) United States Patent
Shetty et al.

(10) Patent No.: US 12,709,392 B2
(45) Date of Patent: Aug. 18, 2026

(54) STOWAGE BIN ASSEMBLIES HAVING ELECTRONIC FRONT PANELS

(71) Applicant: THE BOEING COMPANY, Chicago, IL (US)

(72) Inventors: Kishora Shetty, Karnataka (IN); Daamini Visaalaakshi, Karnataka (IN); Sijo Varghese, Tamil Nadu (IN)

(73) Assignee: The Boeing Company, Arlington, VA (US)

( * ) Notice: Subject to any disclaimer, the term of this patent is extended or adjusted under 35 U.S.C. 154(b) by 553 days.

(21) Appl. No.: 17/507,920

(22) Filed: Oct. 22, 2021

(65) Prior Publication Data

US 2022/0177135 A1 Jun. 9, 2022

Related U.S. Application Data

(60) Provisional application No. 63/120,876, filed on Dec. 3, 2020.

(51) Int. Cl.
*B64D 11/00* (2006.01)
*E05F 15/73* (2015.01)

(52) U.S. Cl.
CPC ............ *B64D 11/003* (2013.01); *E05F 15/73* (2015.01); *E05Y 2201/47* (2013.01); *E05Y 2201/624* (2013.01); *E05Y 2400/82* (2013.01); *E05Y 2900/502* (2013.01); *E05Y 2900/538* (2013.01)

(58) Field of Classification Search
CPC ........ B64D 11/003; E05F 15/73; E05F 15/74; E05F 15/765; E05F 15/767
See application file for complete search history.

(56) References Cited

U.S. PATENT DOCUMENTS 4,185,895 A * 1/1980 Stephens ........... G02F 1/133553 362/346
5,042,923 A * 8/1991 Wolf ..................... E06B 3/6722 359/275
5,790,209 A 8/1998 Engelhardt
5,823,472 A * 10/1998 Luria .................. B64D 11/003 312/266

(Continued)

FOREIGN PATENT DOCUMENTS

CN 110203403 9/2019
EP 1731303 12/2006

(Continued)

OTHER PUBLICATIONS

Extended European Search Report for EP 21200308.1-1010, dated Feb. 28, 2022.

(Continued)

*Primary Examiner* — Marisa V Conlon
(74) *Attorney, Agent, or Firm* — Joseph M. Butscher; Carroll, Hoette & Butscher, LLC

(57) ABSTRACT

A stowage bin assembly and method of operation includes a front panel configured to be selectively switched between a transparent mode and an opaque mode, a baggage retaining chamber defined, at least in part, by the front panel. The front panel is moveable between an open position and a closed position. The front panel can be further configured to be selectively switched to a translucent mode.

21 Claims, 9 Drawing Sheets

(56) References Cited

U.S. PATENT DOCUMENTS

| | | | | |
|---|---|---|---|---|
| 6,493,128 | B1 * | 12/2002 | Agrawal | E06B 9/24 52/204.5 |
| 6,802,478 | B2 * | 10/2004 | Katori | B64D 11/003 312/246 |
| 7,677,495 | B2 * | 3/2010 | Bock | B64D 11/003 244/118.5 |
| 8,788,152 | B2 * | 7/2014 | Reimann | G06F 7/00 49/506 |
| 10,222,029 | B2 * | 3/2019 | Camp, III | F21V 5/048 |
| 11,137,628 | B2 * | 10/2021 | Hoggarth | G10K 11/175 |
| 2008/0055836 | A1 * | 3/2008 | Lamoree | B64D 11/003 361/837 |
| 2013/0161971 | A1 * | 6/2013 | Bugno | B64C 1/1484 296/97.2 |
| 2015/0077337 | A1 * | 3/2015 | Coto-Lopez | G06F 3/017 345/156 |
| 2015/0097389 | A1 * | 4/2015 | Dryselius | G02F 1/13338 296/97.2 |
| 2016/0104437 | A1 * | 4/2016 | Iwakawa | G09G 3/3413 345/88 |
| 2016/0109280 | A1 * | 4/2016 | Tiu | G01F 17/00 702/173 |
| 2016/0318379 | A1 * | 11/2016 | Okuda | B60J 3/04 |
| 2016/0332729 | A1 | 11/2016 | Woicekowski | |
| 2019/0263525 | A1 * | 8/2019 | Cloud | B64D 11/003 |

FOREIGN PATENT DOCUMENTS

| | | | | |
|---|---|---|---|---|
| EP | 3098163 | | 11/2016 | |
| EP | 3354569 | | 8/2018 | |
| FR | 2899199 | | 10/2007 | |
| GB | 2582138 A | * | 9/2020 | B60R 21/026 |
| JP | H05-106962 | | 4/1993 | |
| JP | H10-175436 | | 6/1998 | |
| JP | 2008-291626 | | 12/2008 | |
| JP | 5361323 | | 4/2010 | |
| JP | 2016-078460 | | 5/2016 | |
| JP | 2017-036029 | | 2/2017 | |
| JP | 2019-167089 | | 2/2019 | |
| WO | WO 2015/017507 | | 2/2015 | |

OTHER PUBLICATIONS

JP H10-175436 machine translation.

JP 2008-291626 machine translation.

* cited by examiner

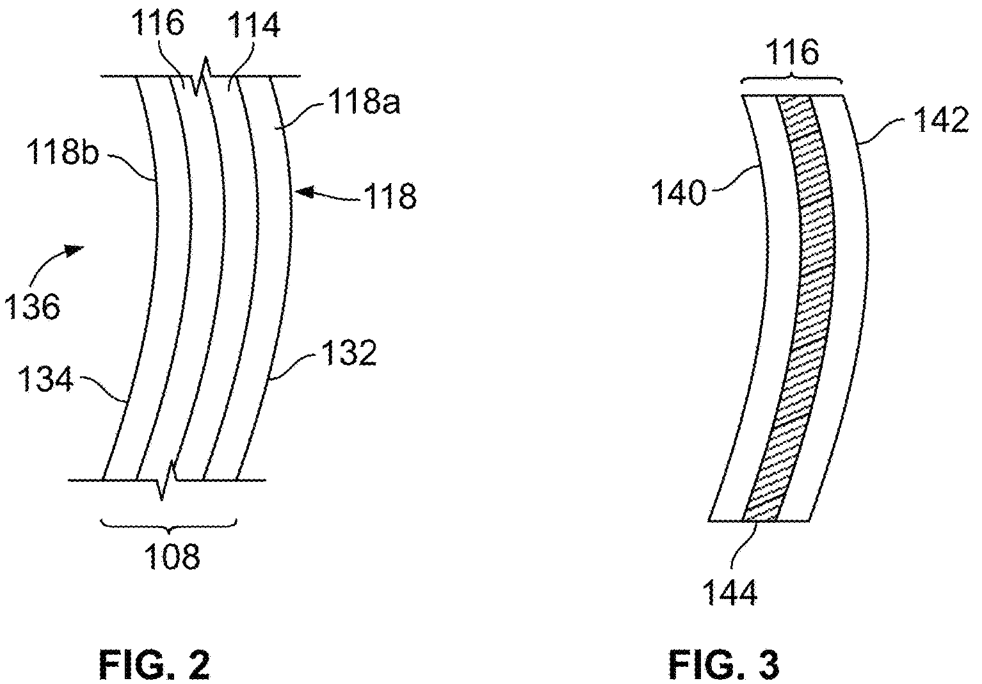
FIG. 2
FIG. 3
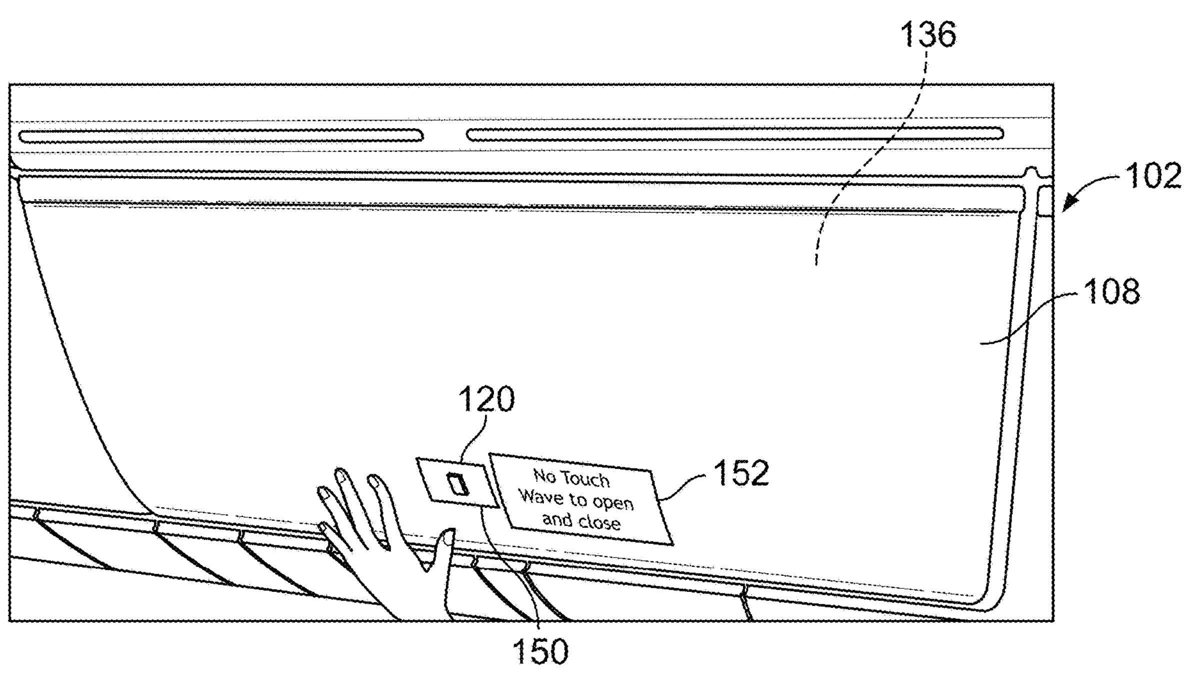
FIG. 4

330
332
333
334
336
338
340
342
344
346
346
346
346
348
348
350
352

380
381
382
383
384
385

STOWAGE BIN ASSEMBLIES HAVING ELECTRONIC FRONT PANELS

CROSS-REFERENCE TO RELATED APPLICATIONS

This application relates to and claims priority benefits from U.S. Provisional Application No. 63/120,876, entitled "Stowage Bin Assemblies Having Electronic Front Panels," filed Dec. 3, 2020, which is hereby incorporated by reference in its entirety.

FIELD OF THE DISCLOSURE

Embodiments of the present disclosure generally relate to internal cabins within vehicles, such as commercial aircraft, and, more particularly, to stowage bin assemblies having electronic front panels within internal cabins of vehicles, such as electronically or magnetically induced adaptive front panels having electronic latches.

BACKGROUND OF THE DISCLOSURE

Commercial aircraft typically include an internal cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Overhead stowage bins are typically positioned above rows of seats within a commercial aircraft. Each overhead stowage bin is configured to be moved between an open position and a closed position. In the open position, passengers may place carry-on luggage within a moveable bin or bucket. Before the aircraft leaves a terminal, flight attendants ensure that each stowage bin is securely closed.

In order to open a stowage bin, an individual (such as a passenger or flight attendant) physically touches a latch of the stowage bin. For example, the individual first grasps and pulls the latch in order to manipulate the stowage bin into an open position. As can be appreciated, the latch of the stowage bin is touched by numerous individuals many times. Consequently, various germs and bacteria may be present on the latch if the latch is not regularly cleaned. Moreover, certain individuals may find grasping and manipulating the latch difficult. Also, boarding time is often extended by passengers opening individual stowage bin assemblies to determine whether or not there is available space therein for their carry-on luggage.

Additionally, individuals typically are not able to determine whether or not a stowage bin assembly is full when the stowage bin assembly is in a closed position. The stowage bin assembly is typically manipulated and opened to determine whether there is additional space therein. As such, an individual may open the stowage bin assembly only to discover there is no additional space therein, while potentially spreading pathogens via touching the stowage bin assembly.

Moreover, stowage bin assemblies occupy substantial space within an internal cabin. Such space is typically not utilized for anything other than stowing luggage and personal items.

SUMMARY OF THE DISCLOSURE

A need exists for an improved stowage bin assembly that allows for individuals to view internal contents without opening the stowage bin assembly. Also, a need exists for a stowage bin assembly that is able to reduce boarding times. Further, a need exists for a stowage bin assembly that reduces the potential of spreading pathogens. Additionally, a need exists for a stowage bin assembly that can provide additional functionality.

With those needs in mind, certain embodiments of the present disclosure provide a stowage bin assembly, including a front panel configured to be selectively switched between a transparent mode and an opaque mode. A baggage retaining chamber is defined, at least in part, by the front panel. The front panel is moveable between an open position and a closed position.

In at least one embodiment, the front panel is further configured to be selectively switched to a translucent mode.

As an example, the stowage bin assembly further includes a bucket that includes the front panel. As another example, the front panel is moveably coupled to a bucket.

In at least one embodiment, the front panel include an electronic layer. The electronic layer is configured to electronically display information on the front panel.

In at least one embodiment, the front panel includes a transparent layer. The transparent layer is selectively dimmable between the transparent mode and the opaque mode.

In at least one embodiment, the front panel includes a protective layer.

In at least one embodiment, the front panel includes an electronic layer, wherein the electronic layer is configured to electronically display information on the front panel; a transparent layer, wherein the transparent layer is configured to selectively dim the front panel between the transparent mode and the opaque mode; and a protective layer disposed one or both of in front of or behind the electronic layer and the transparent layer.

In at least one embodiment, the stowage bin assembly also includes a motion sensor that is configured to detect a predetermined gesture that allows the stowage bin assembly to be one or more of locked, unlocked, opened, or closed in a touchless manner.

As an example, the stowage bin assembly further includes a bin control unit that is configured to control the front panel.

In at least one embodiment, the stowage bin assembly further includes an actuation sub-system operatively coupled to the front panel. The actuation sub-system is configured to automatically move the front panel between an open position and a closed position.

As an example, the actuation sub-system includes a spring configured to exert a spring force into the front panel, and a motor operatively coupled to a spring. As a further example, the actuation sub-system also includes one or more dampening arms that control motion between the closed position and the open position.

Certain embodiments of the present disclosure provide a method of operating a stowage bin assembly. The method includes selectively switching a front panel between a transparent mode and an opaque mode. A baggage retaining chamber is defined, at least in part, by the front panel. The front panel is moveable between an open position and a closed position. As a further example, said selectively switching further includes selectively switching the front panel to a translucent mode.

Certain embodiments of the present disclosure provide a vehicle including an internal cabin, and a stowage bin assembly within the internal cabin, as described herein.

BRIEF DESCRIPTION OF THE DRAWINGS

FIG. 2 illustrates a cross-sectional view of a portion of a front panel, according to an embodiment of the present disclosure.

FIG. 3 illustrates a cross-sectional view of a portion of a transparent layer, according to an embodiment of the present disclosure.

FIG. 4 illustrates a perspective front view of a stowage bin assembly, according to an embodiment of the present disclosure.

DETAILED DESCRIPTION OF THE DISCLOSURE

Figure 1:
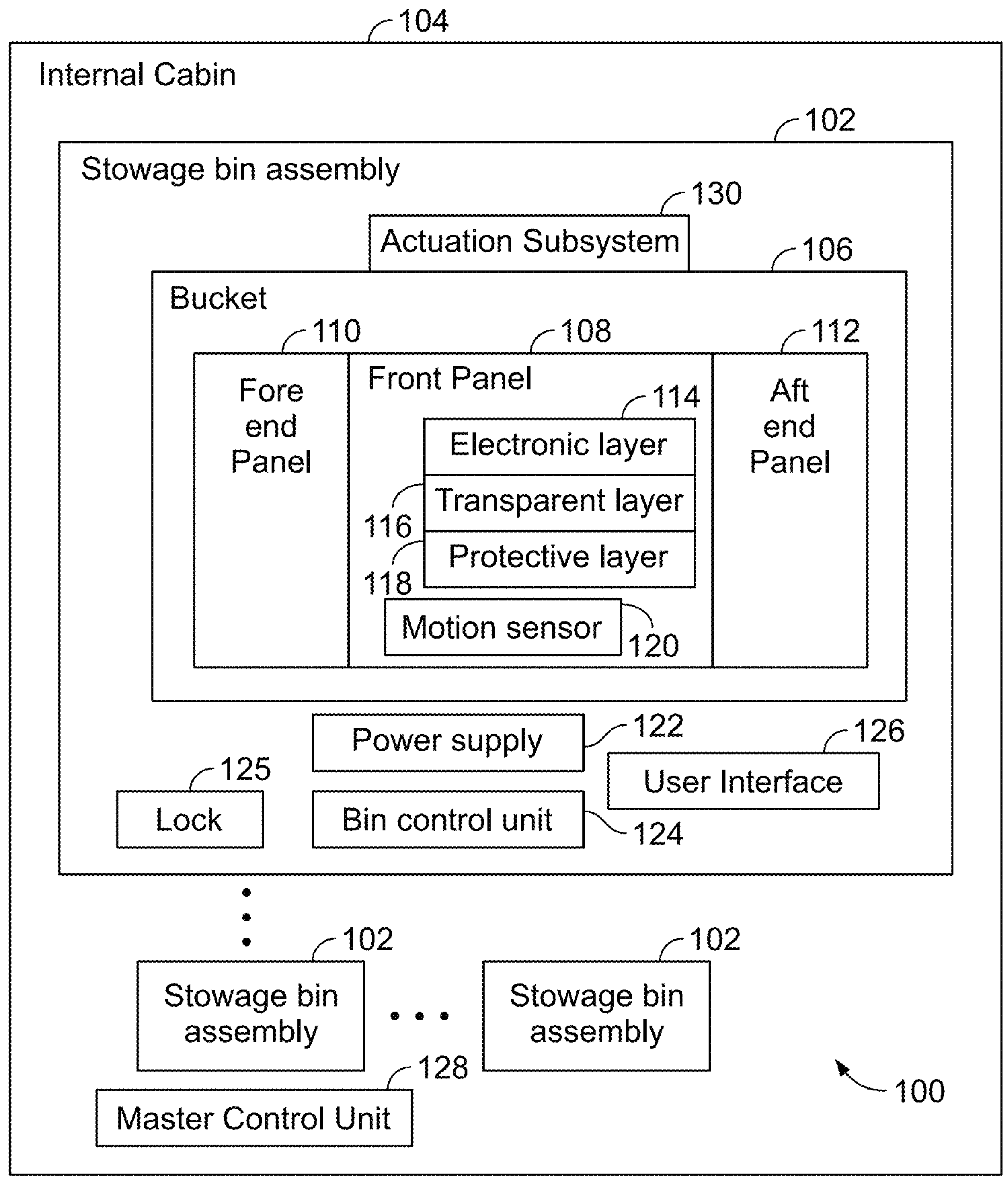
FIG. 1 illustrates a schematic block diagram of a system for operating stowage bin assemblies within an internal cabin, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a stowage bin assembly having a front panel including an electronic layer that is configured to electronically display various graphics, text, and the like on the front panel. The front panel is dimmable, and is further configured to be selectively dimmed.

The stowage bin assembly is configured to be disposed within an internal cabin of a vehicle, such as a commercial aircraft. The front panel is configured to be selectively switched between a transparent mode, a translucent mode, and an opaque mode. In the transparent mode, contents stored within the stowage bin assembly are readily viewable through the front panel. For example, when the front panel is in the transparent mode, individuals are able to see if the stowage bin assembly is filled with baggage, or if there is remaining room therein, even when the stowage bin assembly is in a closed position. For example, the front panel may be within the transparent mode before an aircraft takes off, and after the aircraft lands, so individuals can readily see if there is available space within the stowage bin assembly, if contents have shifted, and/or the like. During flight, such as when the aircraft is at a cruise altitude, the front panel may be switched to the opaque mode.

In at least one embodiment, selective switching between different modes are electronically and/or magnetically induced. An electronic display on the front panel can be used to display flight information, entertainment or advertisements, such as when the front panel is dimmed or opaque. Also, the front panel can be configured to be automatically opened and closed.

In at least one embodiment, the stowage bin assembly is configured to be automatically opened and closed without being touched. As such, individuals such as passenger and crew need not touch the stowage bin assembly in order to open and close the stowage bin assembly, which reduces the potential of pathogens (for example, viruses, bacteria, germs, and the like) from spreading.

The electronic display of the front panel can be used to show various information, such flight information, entertainment (for example, movies), advertisements, and the like, such as when the front panel is opaque or dimmed.

In at least one embodiment, the stowage bin assembly is configured to be automatically opened and closed through a predetermined hand gesture, such as a wave or swipe in front of a motion sensor of the front panel. For example, the stowage bin assembly may be configured to open and close in response to a hand being waved in front of the motion sensor.

FIG. 1 illustrates a schematic block diagram of a system 100 for operating stowage bin assemblies 102 within an internal cabin 104, according to an embodiment of the present disclosure. In at least one embodiment, the internal cabin 104 is within a vehicle, such as a commercial aircraft.

As described herein, the stowage bin assembly 102 includes a front panel 108 configured to be selectively switched between a transparent mode and an opaque mode. In at least one embodiment, the front panel 108 is further configured to be selectively switched to a translucent mode.

At least one of the stowage bin assemblies 102 includes a pivot bin or bucket 106 that is moveably, such as pivotally or slidably, coupled to fixed structure within the internal cabin 104. For example, the bucket 106 is moveably coupled to a strongback, fixed frame, wall, ceiling, and/or the like within the internal cabin 104. In at least one other embodiment, the bucket 106 is secured in a fixed relation to other fixed structure within the internal cabin 104.

The bucket 106 is coupled to or includes a front panel 108. The front panel 108 is a front of portion of the stowage bin assembly 102. In at least one embodiment, the front panel 108 is a portion of the bucket 106. In at least one embodiment, the front panel 108 is a moveable door coupled to the bucket 106. In at least one embodiment, the front panel 108 is connected to a fore end panel 110 and an aft end panel 112 that is opposite from the fore end panel 110. A baggage retaining chamber is defined, at least in part, between the front panel 108, the fore end panel 110, and the aft end panel 112. Optionally, the bucket 106 may not include the fore end panel 110 and/or the aft end panel 112. In at least one embodiment, the front panel 108 is moveably coupled to a the bucket 106, which may be fixed. The bucket 106 can include the end panels, and a rear panel.

The front panel 108 includes an electronic layer 114 coupled to a transparent layer 116, and a protective layer 118. The electronic layer 114 provides an electronic display that is configured to electronically display various information, such as text, graphics, video, and/or the like. For example, the electronic layer 114 can be a television screen, monitor, or the like. The electronic layer 114 can include a polycarbonate film, transparent metal, and/or the like. In at least one embodiment, the electronic layer 114 is a plasma display. In at least one other embodiment, the electronic layer includes a plurality of light-emitting diodes (LEDs), and provides an LED display. Alternatively, the front panel 108 may not include an electronic layer.

The transparent layer 116 is configured to be switched between a transparent mode and an opaque mode. For example, the transparent layer 116 is dimmable. The transparent layer 116 may be selectively adjustable between the transparent mode, the opaque mode, and adjustably dimmable between the transparent mode and the opaque mode. For example, the transparent layer 116 can be gradually dimmed between the transparent mode and the opaque mode. The transparent layer 116 can be adjustably dimmed at various levels between the transparent mode and the opaque mode.

In at least one embodiment, the transparent layer 116 is an electro-chromic or magnetic film panel. In at least one embodiment, the electro-chromic or magnetic film panel includes two conductive panels sandwiching a gel medium that contains materials capable of generating color in response to an electrical current, where a voltage applied across the gel medium via the two conductive panels causes the gel medium to darken and removal of the voltage across the gel causes the gel to return to a transparent state. One example of a gel electrolyte material usable in an electro-chromic panel may be a polymethylmethacrylate. The electro-chromic panel may further include regions without the gel disposed between the conductive panels, where the region is proximate a motion sensor behind the front panel 108, such that passenger hand motion can be sensed even when the transparent layer is selectively switched to an opaque state.

The protective layer 118 is formed of a resilient transparent material. For example, the protective layer 118 is a transparent plastic. The protective layer 118 can be formed of clear acrylic, for example. As another example, the protective layer 118 can be formed of clear plexiglass. In at least one embodiment, the protective layer 118 is disposed in front of and behind the electronic layer 114 and the transparent layer 116. The protective layer 118 protects the electronic layer 114 and the transparent layer 116 from external forces (for example, being bumped from outside the bucket 106) and internal forces (for example, from baggage within the bucket 106 from abutting against the electronic layer 114 and/or the transparent layer 116). As an example, the protective layer 118 can encase the electronic layer 114 and the transparent layer 116.

In at least one embodiment, the electronic layer 114, the transparent layer 116, and the protective layer 118 extend along an entire length and height of the front panel 108. For example, the electronic layer 114, the transparent layer 116, and the protective layer 118 can form an entirety of the front panel 108. In at least one other embodiment, the electronic layer 114, the transparent layer 116, and the protective layer 118 may span only a portion of the length and height of the front panel 108. For example, the front panel 108 can be formed of a plastic and/or composite material, and the electronic layer 114, the transparent layer 116, and the protective layer 118 can be embedded within such material, positioned within a channel or recess formed in such material, and/or the like.

In at least one embodiment, the front panel 108 also includes a motion sensor 120 that is configured to detect motion in front of the front panel 108. The motion sensor 120 can be disposed at a front, bottom portion of the front panel 108. The motion sensor 120 can be a radar motion sensor, a LIDAR motion sensor, an infrared motion sensor, an ultrasonic motion sensor, a laser motion sensor, and/or the like. The motion sensor 120 is configured to detect motion within a predetermined range, such as within 3 inches or less in front of the motion sensor 120. Alternatively, the system 100 does not include the motion sensor 120.

In at least one embodiment, the stowage bin assembly 102 also includes a power supply 122, such as a battery. Optionally, the power supply 122 can be a source of power within the internal cabin 104, such as a standard source of alternating current power. Further, optionally, the power supply 122 can be disposed outside of the stowage bin assembly 102, such as on or within fixed structure within the internal cabin 104.

The power supply 122 is connected to the electronic layer 114 and/or the transparent layer 116, such as through one or more wired or wireless connections. The power supply 122 provides power for the electronic layer 114 and the transparent layer 116 to operate.

The stowage bin assembly 102 also includes a bin control unit 124 that is coupled to the power supply 122, the electronic layer 114, and the transparent layer 116, such as through one or more wired or wireless connections. As shown, the bin control unit 124 can be disposed within the stowage bin assembly 102. Optionally, the bin control unit 124 may be disposed outside of the stowage bin assembly 102. The bin control unit 124 receives electrical power through the power supply 122, and is configured to operate the electronic layer 114 and the transparent layer 116. Alternatively, the stowage bin assembly 102 does not include a bin control unit 124. Instead, a master control unit 128 within the internal cabin 104 may be configured to control operation of each of the stowage bin assemblies 102.

In at least one embodiment, the stowage bin assembly 102 also includes a user interface 126. The user interface 126 is in communication with the bin control unit 124 through one or more wired or wireless connections. The user interface 126 can be a physical keypad, one or more switches, a monitor, a touchscreen interface, and/or the like. The user interface 126 can be on a front surface of the front panel 108. As another example, the user interface 126 can be within a baggage retaining chamber of the stowage bin assembly 102. As another example, the user interface 126 can be a touchscreen interface provided by the electronic layer 114. As another example, the user interface 126 can be outside of the stowage bin assembly 102.

The user interface 126 allows an individual to selectively switch the front panel 108 between a transparent mode, a translucent mode, and an opaque mode. Optionally, the user interface 126 may be a master user interface that is in communication with the master control unit 128 within the internal cabin 104. The master control unit 128 is in communication with the bin control unit 124 of all of the stowage bin assemblies 102 and is configured to control operation of the front panel 108 from a centralized location. Alternatively, the system 100 does not include the user interface 126.

In at least one embodiment, the stowage bin assembly 102 also includes an actuation sub-system 130. The actuation sub-system 130 is configured to automatically open and/or automatically close the bucket 106. The actuation sub-system 130 is in communication with the bin control unit 124, such as through one or more wired or wireless connections. Alternatively, the stowage bin assembly 102 does not include the actuation sub-system 130.

In operation, the front panel 108 is moveable between an open state and a closed state. The front panel 108 is operated, such as by the bin control unit 124 and/or the master control unit 128, between a transparent mode, a translucent mode, and an opaque mode. In the transparent mode, the transparent layer 116 is clear and transparent, thereby allowing individuals to see through the front panel 108 into the baggage retaining chamber, whether or not the front panel 108 is in the open state or the closed state. In the translucent mode, the transparent layer 116 is dimmed, such that the transparent layer 116 is not completely transparent and clear. In the translucent or dimmed state, individuals can still see through the front panel 108 into the baggage retaining chamber, but the front panel 108 is dimmed. The translucent mode allows the electronic layer 114 to electronically display information (such as travel information, text, video, and/or the like) on the front panel 108, while also allowing individuals to see through the front panel 108. In the opaque mode, the transparent layer 116 is fully dimmed and opaque, thereby blocking viewing into the baggage retaining chamber through the front panel 108. In the opaque mode, the electronic layer 114 can electronically display information on the front panel 108.

In order to lock, unlock, open and/or close the bucket 106, an individual gestures a hand, for example, in front of the front panel 108 within the predetermined range (such as within 5 inches) of the motion sensor 120. The bin control unit 124 is programmed to recognize a gesture, as detected by the motion sensor 120. The gesture is used to lock, unlock, open and/or close the bucket 106 within an individual touching the bucket 106. For example, the gesture can be a side-to-side wave in front of the motion sensor 120 a predetermined number of times. For example, the side-to-side wave can be three times from end to end of the motion sensor 120 over a predetermined time period, such as 3 seconds or less. In this manner, the predetermined gesture can be differentiated from individuals walking past the front panel 108 or inadvertently being too close to the front panel. The gesture can be repeated a predetermined number of times over a predetermined time period, as recognized by the bin control unit 124. For example, the predetermined number of times can be between 2 and 7 times, and the predetermined period of time can be 5 seconds or less. As noted, the gesture can be a hand wave from side-to-side along a predetermined range length of the motion sensor 120. Optionally, the gesture can be from top to bottom along a predetermined length of the motion sensor 120. As another example, the gesture can be a door knocking motion in front of, but not contacting, the front panel 108.

The bin control unit 124 receives a motion signal from the motion sensor 120 indicative of motion in front of the front panel 108. The bin control unit 124 is configured to recognize the predetermined gesture from the motion signal. If the motion signal received by the bin control unit 124 is recognized by the bin control unit 124 as the predetermined gesture, the bin control unit 124 lock or unlocks the stowage bin assembly 102, and/or operates the actuation sub-system 130 to move the front panel 108 and/or the bucket 106, such as by opening or closing the front panel 108 and/or the bucket 106. If, however, the motion signal received by the bin control unit 124 is not recognized by the bin control unit 124 as the predetermined gesture, the bin control unit 124 does not lock or unlock the stowage bin assembly 102, and/or operate the actuation sub-system 130 to move the bucket 106.

The bin control unit 124 can be configured to lock or unlock the stowage bin assembly 102 based on the predetermined gesture. For example, the bin control unit 124 can be in communication with a lock 125 (such as an electronic lock in communication with the bin control unit 124 through one or more wired or wireless connections) of the stowage bin assembly 102. In the locked state, the stowage bin assembly 102 is not able to be opened. In the unlocked state, the stowage bin assembly 102 can be opened. In at least one embodiment, the bin control unit 124 is configured to lock and/or unlock the stowage bin assembly 102 without opening or closing the stowage bin assembly 102. In at least one other embodiment, the stowage bin assembly 102 does not include the lock 125, and the bin control unit 124 is configured to open and close the stowage bin assembly 102 without locking or unlocking the stowage bin assembly 102.

In at least one embodiment, the master control unit 128 is configured to control operation of all of the stowage bin assemblies 102. For example, the master control unit 128 can selectively switch the front panels 108 between the transparent mode, the translucent mode, and the opaque mode, such as in conjunction with different phases of travel. For example, during boarding and disembarking phases, the master control unit 128 may operate the front panels in the transparent mode. During a cruise phase, the master control unit 128 may operate the front panels in the opaque mode. Alternatively, the system 100 may not include the master control unit 128.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the bin control unit 124 and the master control unit 128 may be or include one or more processors that are configured to control operation, as described herein.

The bin control unit 124 and the master control unit 128 are configured to execute a set of instructions that are stored in one or more data storage units or elements (such as one or more memories), in order to process data. For example, the bin control unit 124 and the master control unit 128 may include or be coupled to one or more memories. The data storage units may also store data or other information as desired or needed. The data storage units may be in the form of an information source or a physical memory element within a processing machine.

The set of instructions may include various commands that instruct the bin control unit 124 and the master control unit 128 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the bin control unit 124 and the master control unit 128. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the bin control unit 124 and the master control unit 128 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

FIG. 2 illustrates a cross-sectional view of a portion of the front panel 108, according to an embodiment of the present disclosure. In at least one embodiment, the transparent layer 116 is disposed over the electronic layer 114. The electronic layer 114 can be in front of the transparent layer 116 toward an outer surface 132 of the front panel 108. Optionally, the transparent layer 116 can be behind the electronic layer 114 toward an inner surface 134 of the front panel 108. The inner surface 134 faces the baggage retaining chamber 136.

In at least one embodiment, the protective layer 118 includes an outer protective layer 118*a* that forms at least a portion of the outer surface 132, and an inner protective layer 118*b* that forms at least a portion of the inner surface 134. Optionally, the protective layer 118 includes one of the outer protective layer 118*a* or the inner protective layer 118*b*. In at least one embodiment, the protective layer 118 fully encases the electronic layer 114 and the transparent layer 116.

FIG. 3 illustrates a cross-sectional view of a portion of the transparent layer 116, according to an embodiment of the present disclosure. As an example, the transparent layer 116 can include a first conductive panel 140, a second conductive panel 142, and a gel medium 144. The gel medium 144 is sandwiched between the first conductive panel 140 and the second conductive panel 142.

FIG. 4 illustrates a perspective front view of the stowage bin assembly 102, according to an embodiment of the present disclosure. As shown in FIG. 4, the front panel 108 is in the opaque mode, such that an individual cannot see through the front panel 108 into the baggage retaining chamber 136 behind the front panel 108.

The front panel 108 includes a latch 150, which may include the lock 125 (shown in FIG. 1). The latch 150 may be an actual, physical latch secured to the front panel 108. As another example, the latch 150 can be a virtual latch proximate to the motion sensor 120 (for example, the virtual latch 150 can be shown in front of the motion sensor 120). In at least one embodiment, the electronic layer 114 shows an electronic representation of the latch 150 on the front panel 108. The electronic layer 114 can also show a message 152 on the front panel 108 indicating instructions for operating the latch 150. The message 152 can indicate that the latch 150 is configured to be operated in a touchless manner.

Figure 5:
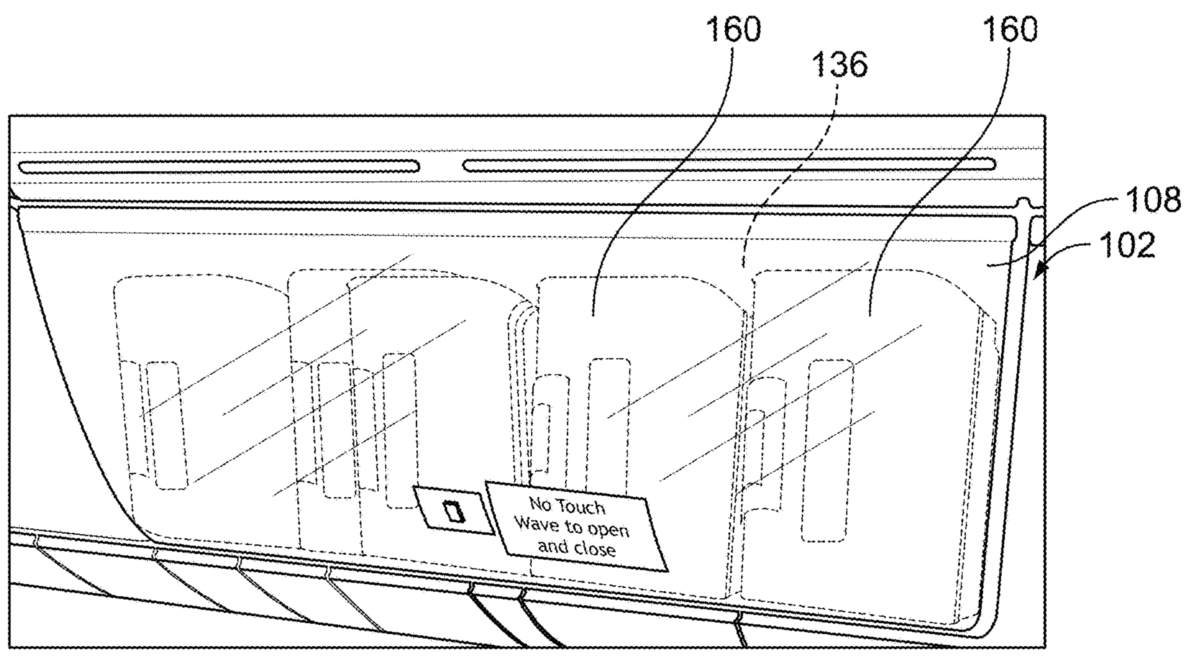
FIG. 5 illustrates a perspective front view of the stowage bin assembly having the front panel in a transparent mode, according to an embodiment of the present disclosure.

FIG. 5 illustrates a perspective front view of the stowage bin assembly 102 having the front panel 108 in the transparent mode, according to an embodiment of the present disclosure. Referring to FIGS. 1 and 5, in the transparent mode, the transparent layer 116 is clear, transparent, and undimmed. As such, the front panel 108 is clear, thereby allowing an individual to see into the baggage retaining chamber 136 and see contents 160 (such as carry-on baggage) retained therein.

The front panel 108 can be in the transparent mode such as when passengers are boarding and/or disembarking from a vehicle. During such periods, individuals may readily view the internal capacity of the stowage bin assembly 102, which allows for quicker boarding (for example, passengers need not open the stowage bin assembly 102 to determine available capacity), and increased safety (for example, individuals can readily see if contents within the stowage bin assembly 102 shifted during flight).

Figure 6:
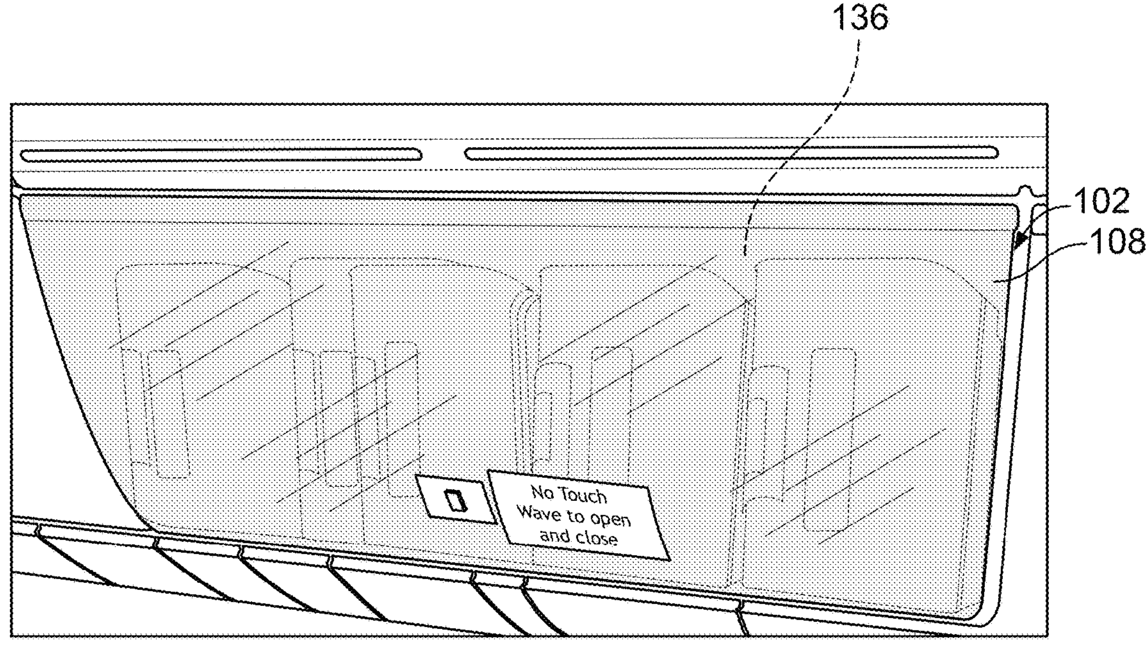
FIG. 6 illustrates a perspective front view of the stowage bin assembly having the front panel in a translucent mode, according to an embodiment of the present disclosure.

FIG. 6 illustrates a perspective front view of the stowage bin assembly 102 having the front panel 108 in the translucent mode, according to an embodiment of the present disclosure. Referring to FIGS. 1 and 6, in the translucent mode, the transparent layer 116 is dimmed so as not to be fully clear. However, in the translucent mode, the dimmed transparent layer 116 still allows an individual to view the contents of the baggage retaining chamber 136. In the translucent mode, the electronic layer 114 may electronically show various forms of information on the front panel 108, such as text, graphics, video, and/or the like.

The front panel 108 can be in the translucent mode such as when passengers are boarding and/or disembarking from a vehicle. During such periods, individuals may readily view the internal capacity of the stowage bin assembly 102.

Figure 7:
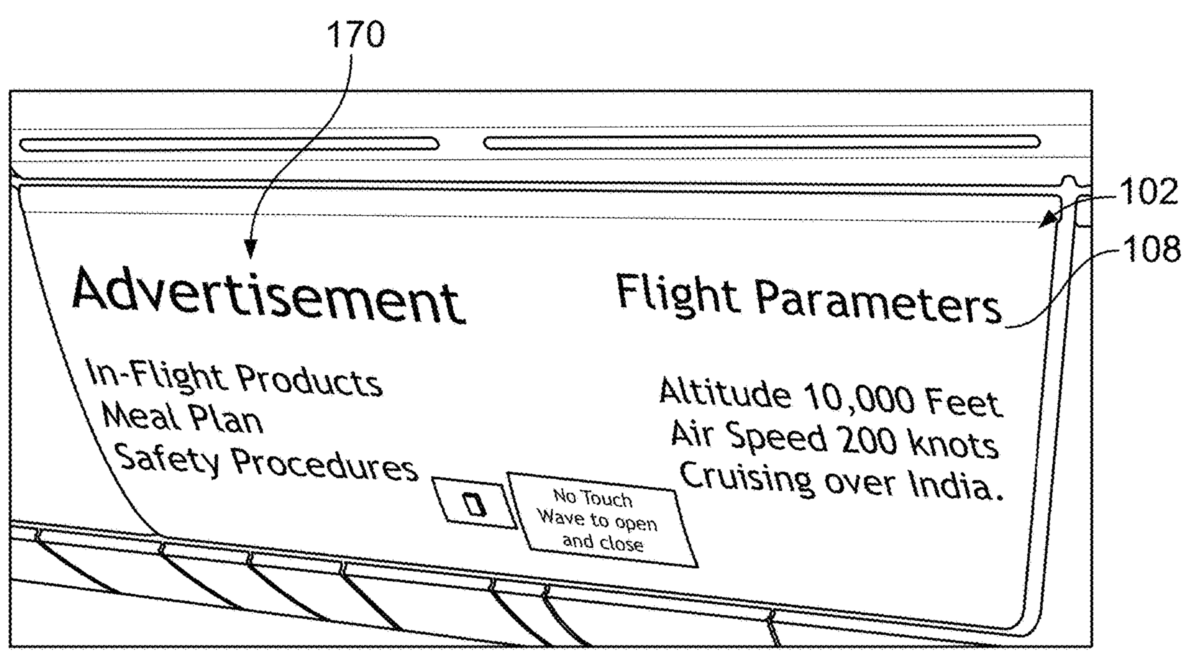
FIG. 7 illustrates a perspective front view of the stowage bin assembly having the front panel in an opaque mode, according to an embodiment of the present disclosure.

FIG. 7 illustrates a perspective front view of the stowage bin assembly 102 having the front panel 108 in the opaque mode, according to an embodiment of the present disclosure. Referring to FIGS. 1 and 7, in the opaque mode, the transparent layer 116 is opaque (for example, fully dimmed or darkened) so as not to allow viewing through the front panel 108. In the opaque mode, the electronic layer 114 may electronically show various forms of information 170 on the front panel 108, such as text, graphics, video, and/or the like.

The information 170 may include advertisements, available products, available food and beverage items, safety information, flight parameters (for example, altitude, air speed, position), and/or the like. In at least one embodiment, the information 170 can include video information, such as commercials, television shows, movies, and/or the like.

The front panel 108 can be in the opaque mode during one or more phases of travel. For example, the front panel 108 can be in the opaque mode when an aircraft is cruising or at other times when indication of available space within the stowage bin assembly 102 is unnecessary.

Figure 8:
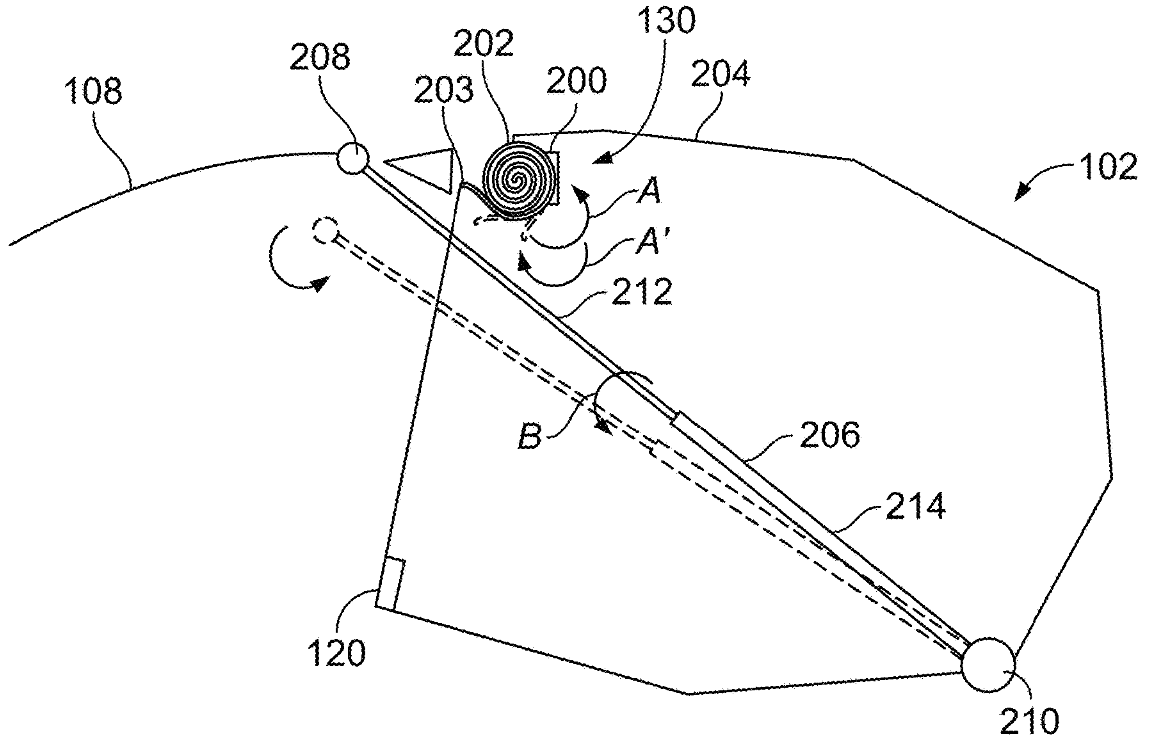
FIG. 8 illustrates an end view of the stowage bin assembly, according to an embodiment of the present disclosure.

FIG. 8 illustrates an end view of the stowage bin assembly 102, according to an embodiment of the present disclosure. In at least one embodiment, the stowage bin assembly 102 includes the actuation sub-system 130. As one example, the actuation sub-system 130 includes a motor 200 operatively coupled to a spring 202, such as a spiral spring. The spring 202 exerts a spring force into the front panel 108, such as an internal, rear surface of the front panel 108. The motor 200 and the spring 202 are disposed proximate a top of the stowage bin assembly 102, such as proximate to a pivotal coupling of the front panel 108 and a fixed portion 204 of the stowage bin assembly 102.

The actuation sub-system 130 further includes a moveable arm 206 coupled between the front panel 108 and a rear, lower portion of the stowage bin assembly 102. For example, a first pivot joint 208 pivotally couples the arm 206 to the front panel 108, and a second pivot joint 210 pivotally couples the arm 206 to the fixed portion 204. The arm 206 includes an extension piston 212 moveably retained by a dampening sleeve 214. In at least one embodiment, a moveable arm 206 as shown is disposed at either end of the stowage bin assembly 102. As another example, only one end includes the moveable arm 206. The arm(s) 206 provide dampening members that are configured to control a rate of motion of the front panel 108 between the closed position and the open position. As such, the arm(s) 206 is a dampening arm.

In at least one embodiment, the motor 200 is in communication with the bin control unit 124 (shown in FIG. 1), such as through one or more wired or wireless connections. The motor 200 is configured to rotate the spring 202, such as in the direction of arc A.

As described herein, referring to FIGS. 1 and 8, the motion sensor 120 is configured to detect the predetermined gesture The bin control unit 124 then operates the actuation sub-system 130 to automatically open and/or close the front panel 108.

Force needed to open the front panel 108 is stored within the spring 202 as strain energy. When the bin control unit 124 receives a signal from the motion sensor 120 to open the front panel 108, the bin control unit 124 can unlatch the front panel 108. The stored strain energy within the spring 202 moves in the direction of arc A', thereby opening the front panel 108. For example, the spring 202 includes an exposed end 203 that abuts into a rear surface of the front panel 108, thereby forcing the front panel 108 open. The arm 206 provides a dampening effect to control the rate of opening, in order to ensure that the front panel 108 opens safely.

The weight of the front panel 108 allows for the front panel 108 to be easily closed via a slight pull force from the arm 206 in the direction of arc B. The bin control unit 124 can operate the motor 200 to rotate the spring 202 in the direction of arc A to reduce the force applied by the spring 202 into the front panel 108, thereby allowing the front panel 108 to close.

Optionally, the actuation sub-system 130 can be configured differently than shown. For example, the actuation sub-system 130 can include hydraulic, pneumatic, electronic, or other such actuators coupled to the front panel 108. For example, a rotary engine can be coupled to a pivot axle extending through at least a portion of the front panel 108. Alternatively, the stowage bin assembly 102 does not include an actuation sub-system.

Figure 9:
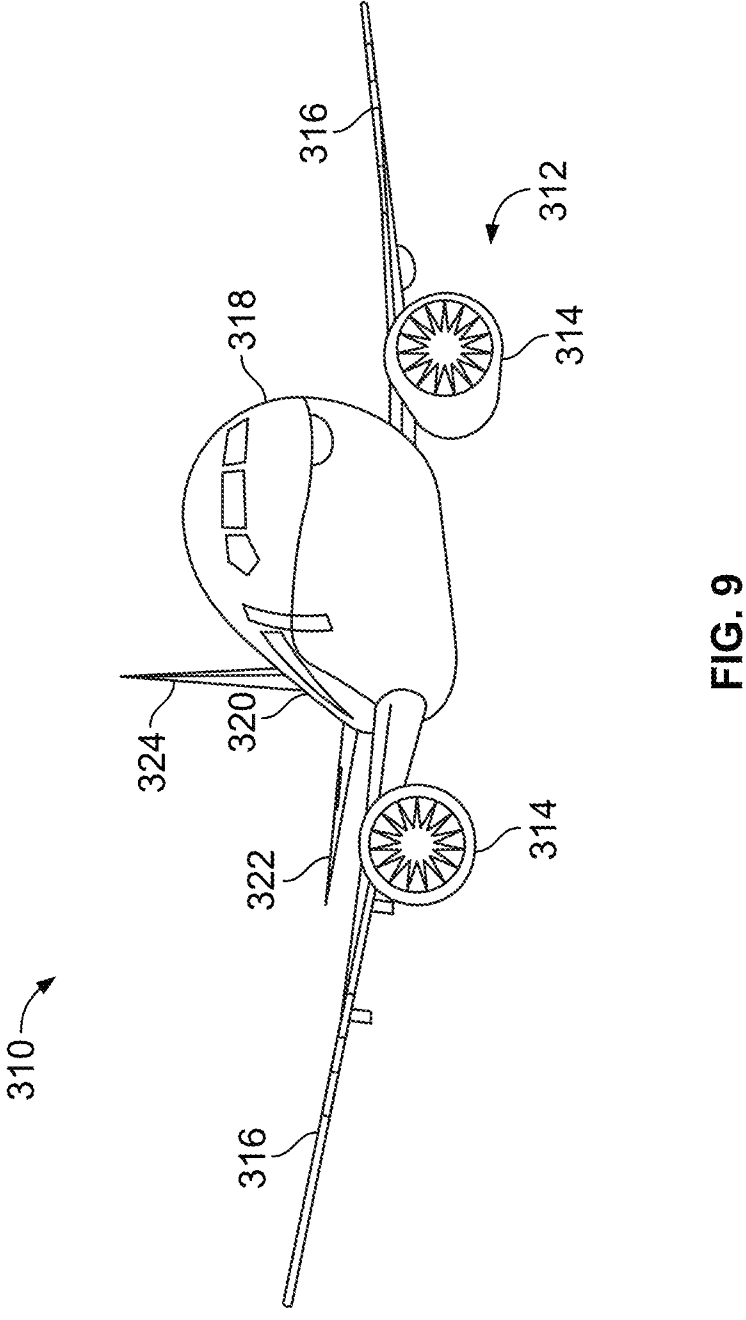
FIG. 9 illustrates a front perspective view of an aircraft.

FIG. 9 illustrates a front perspective view of a vehicle, such as an aircraft 310. The aircraft 310 includes a propulsion system 312 that includes two engines 314, for example. Optionally, the propulsion system 312 may include more engines 314 than shown. The engines 314 are carried by wings 316 of the aircraft 310. In other embodiments, the engines 314 may be carried by a fuselage 318 and/or an empennage 320. The empennage 320 may also support horizontal stabilizers 322 and a vertical stabilizer 324.

The fuselage 318 of the aircraft 10 defines an internal cabin, which may include a cockpit, one or more work sections (for example, galleys, personnel carry-on baggage areas, and the like), one or more passenger sections (for example, first class, business class, and coach sections), and an aft section. Each of the sections may be separated by a cabin transition area. Overhead stowage bin assemblies are positioned throughout the internal cabin.

Alternatively, instead of an aircraft, embodiments of the present disclosure may be used with various other vehicles, such as automobiles, buses, locomotives and train cars, seacraft, spacecraft, and the like.

Figures 10A, 10B:
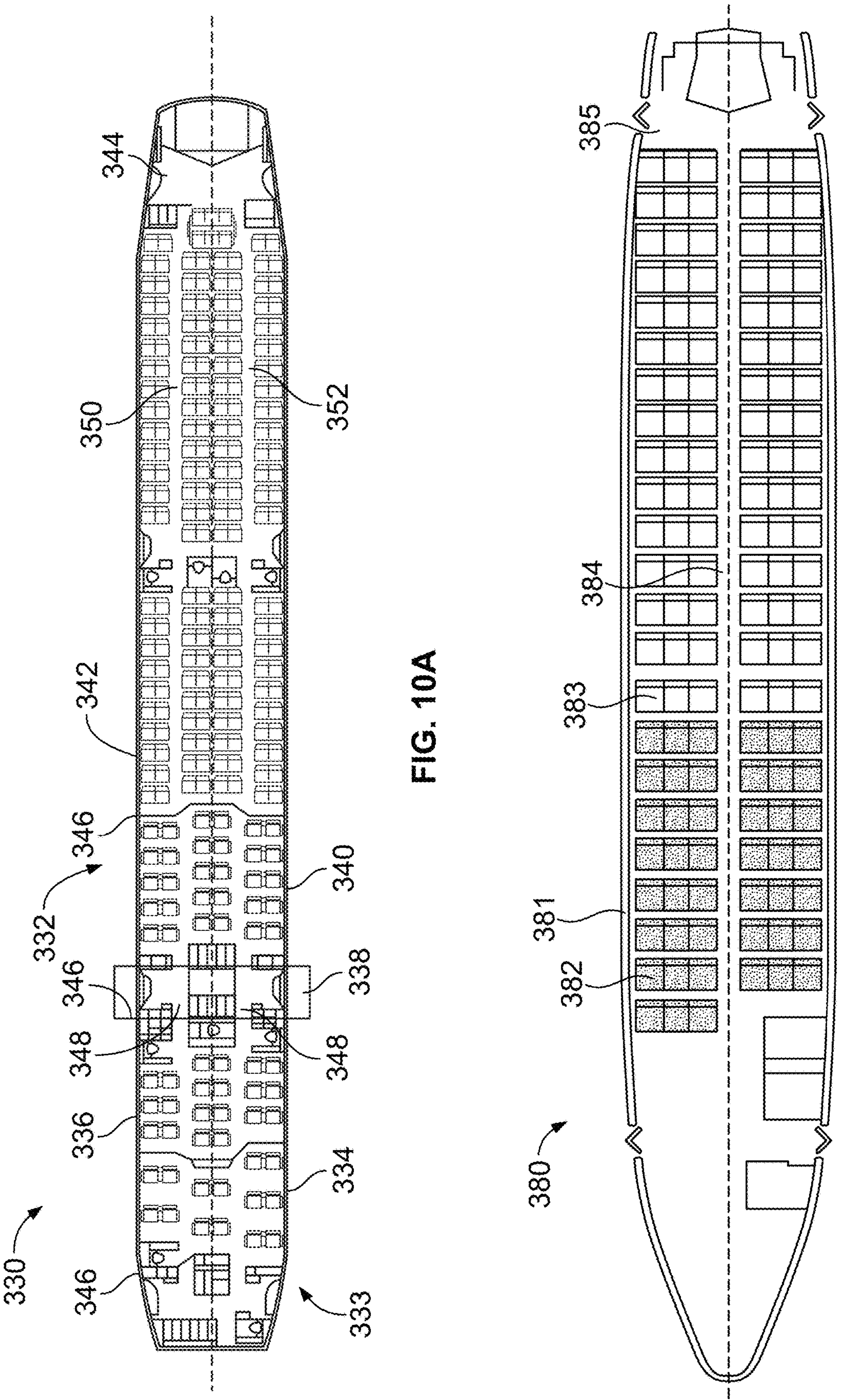
FIG. 10A illustrates a top plan view of an internal cabin of an aircraft.
FIG. 10B illustrates a top plan view of an internal cabin of an aircraft.

FIG. 10A illustrates a top plan view of an internal cabin 330 of an aircraft. The internal cabin 330 may be within a fuselage 332 of the aircraft. For example, one or more fuselage wall members may define the internal cabin 330. The internal cabin 330 includes multiple sections, including a front section 333, a first class section 334, a business class section 336, a front galley station 338, an expanded economy or coach section 340, a standard economy or coach section 342, and an aft section 344, which may include multiple lavatories and galley stations. It is to be understood that the internal cabin 330 may include more or less sections than shown. For example, the internal cabin 330 may not include a first class section, and may include more or less galley stations than shown. Each of the sections may be separated by a cabin transition area 346, which may include class divider assemblies between aisles 348.

As shown in FIG. 10A, the internal cabin 330 includes two aisles 350 and 352 that lead to the aft section 344. Optionally, the internal cabin 330 may have less or more aisles than shown. For example, the internal cabin 330 may include a single aisle that extends through the center of the internal cabin 330 that leads to the aft section 344.

FIG. 10B illustrates a top plan view of an internal cabin 380 of an aircraft. The internal cabin 380 may be within a fuselage 381 of the aircraft. For example, one or more fuselage wall members may define the internal cabin 380. The internal cabin 380 includes multiple sections, including a main cabin 382 having passenger seats 383, and an aft section 385 behind the main cabin 382. It is to be understood that the internal cabin 380 may include more or less sections than shown.

The internal cabin 380 may include a single aisle 384 that leads to the aft section 385. The single aisle 384 may extend through the center of the internal cabin 380 that leads to the aft section 385. For example, the single aisle 384 may be coaxially aligned with a central longitudinal plane 386 of the internal cabin 380.

Figure 11:
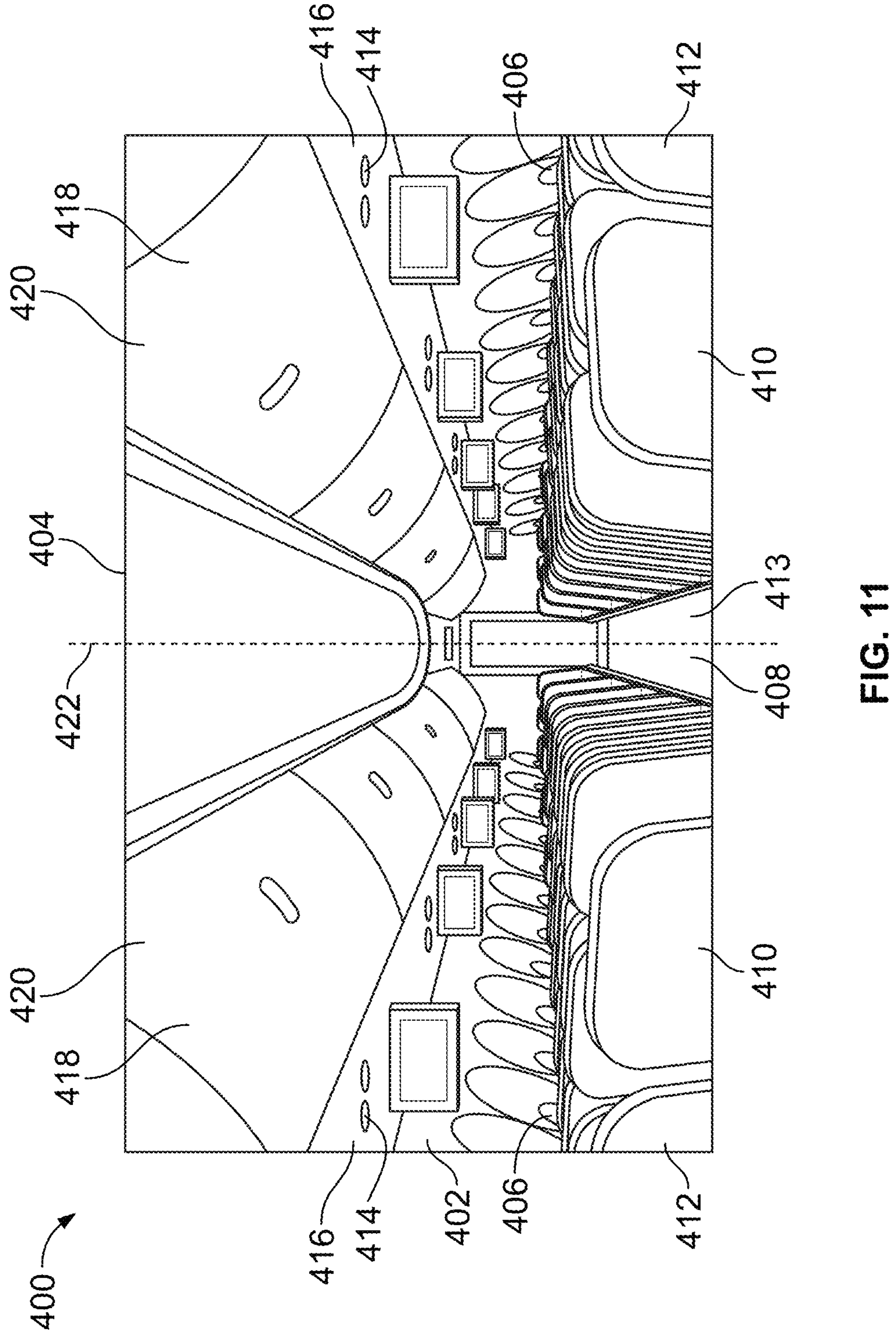
FIG. 11 illustrates an interior perspective view of an internal cabin of an aircraft.

FIG. 11 illustrates an interior perspective view of an internal cabin 400 of an aircraft. The internal cabin 400 includes outboard wall members 402 and a ceiling 404, which may include a plurality of ceiling panels. Windows 406 may be formed within the outboard wall members 402. A floor member 408 supports rows of seats 410. As shown in FIG. 11, a row 412 may include two seats 410 on either side of an aisle 413. However, the row 412 may include more or less seats 410 than shown. Additionally, the internal cabin 400 may include more aisles than shown.

Passenger service units (PSUs) 414 are secured between an outboard wall member 402 and the ceiling 404 on either side of the aisle 413. The PSUs 414 extend between a front end and rear end of the internal cabin 400. For example, a PSU 414 may be positioned over each seat 410 within a row 412. Each PSU 414 may include a housing 416 that generally contains passenger air outlets, reading lights, an oxygen supply system (such as an oxygen bag drop panel), an attendant call button, and other such controls over each seat 410 (or groups of seats) within a row 412.

Overhead stowage bin assemblies 418 (such as the stowage bin assemblies 102 shown and described with respect to FIG. 1) are secured to the structure proximate to the ceiling 404 and/or the outboard wall member 402 above and inboard from the PSU 414 on either side of the aisle 413. The overhead stowage bin assemblies 418 are secured over the seats 410. The overhead stowage bin assemblies 418 extend between the front and rear end of the internal cabin 400. Each stowage bin assembly 418 may include a pivot bin or bucket 420 pivotally secured to a strongback (hidden from view in FIG. 11). The overhead stowage bin assemblies 418 may be positioned above and inboard from lower surfaces of the PSUs 414. The overhead stowage bin assemblies 418 are configured to be pivoted open in order to receive passenger carry-on baggage and personal items, for example.

As used herein, the term "outboard" means a position that is further away from a central longitudinal plane 422 of the internal cabin 400 as compared to another component. The term "inboard" means a position that is closer to the central longitudinal plane 422 of the internal cabin 400 as compared to another component. For example, a lower surface of a PSU 414 may be outboard in relation to a stowage bin assembly 418.

Figure 12:
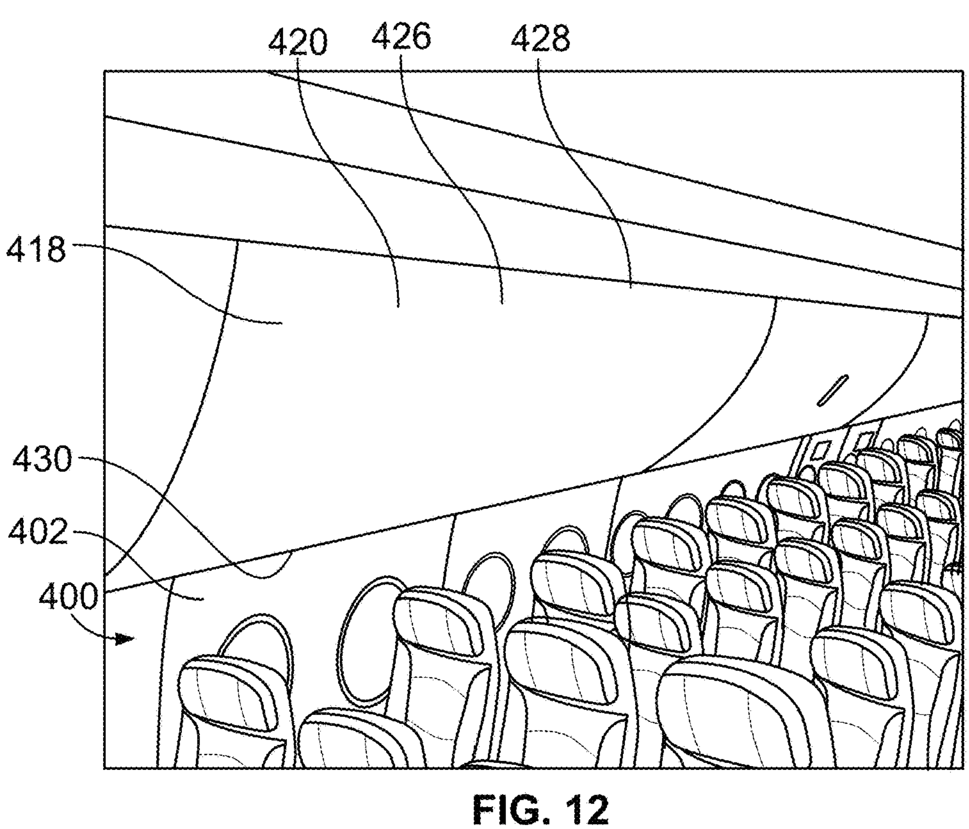
FIG. 12 illustrates a front perspective view of a stowage bin assembly in a closed position within an internal cabin.

FIG. 12 illustrates a front perspective view of a stowage bin assembly 418 (such as the stowage bin assembly 102 shown and described with respect to FIG. 1) in a closed position within the internal cabin 400. The stowage bin assembly 418 includes a bucket 420 having a front panel 426 connected to forward and aft end panels (hidden from view in FIG. 12). As shown, the front panel 426 may be an arcuate panel having a curved outer surface that curves downwardly toward the outboard wall member 402. As such, a top portion 428 of the front panel 426 is inboard in relation to a lower portion 430.

Figure 13:
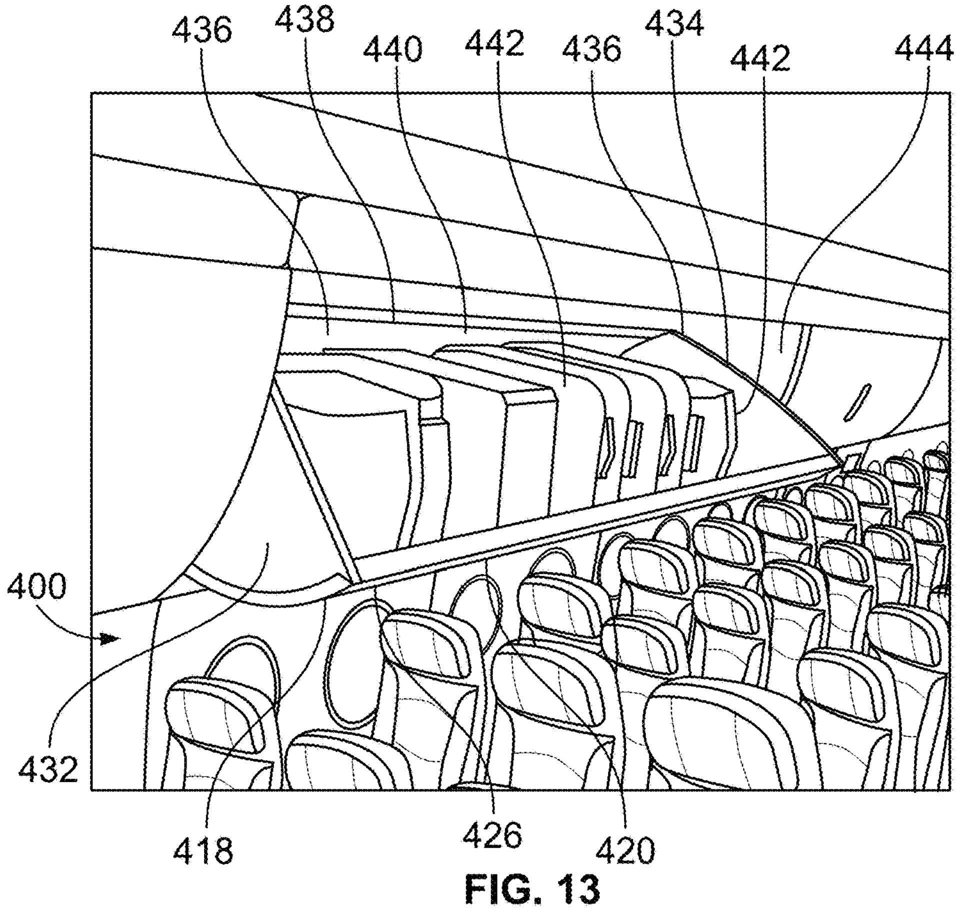
FIG. 13 illustrates a front perspective view of a stowage bin assembly in an open position within an internal cabin.

FIG. 13 illustrates a front perspective view of the stowage bin assembly 418 in an open position within the internal cabin 400. As shown, the front panel 426 is secured to a forward end panel 432 and an aft end panel 434, which may generally be opposed and parallel to one another. The front panel 426 and the end panels 432 and 434 may also connect to a bottom panel 436. The bottom panel 436 may be an inwardly curved portion of the front panel 426, for example. In at least one embodiment, a closeout bracket 438 may span between the end panels 432 and 434 and provide a rigid bracing support therebetween. The front panel 426 may be thicker than the end panels 432 and 434, as the front panel 426 is configured to directly support a weight of overhead bags. As such, the front panel 426 may have increased thickness in order to provide additional support strength and rigidity.

A baggage retaining chamber 440 is defined between the front panel 426, the end panels 432 and 434, and the bottom panel 436. The baggage retaining chamber 440 is configured to receive baggage 442 when the stowage bin assembly 418 is in the open position.

The end panels 432 and 434 are each pivotally secured to fixed panels 444, such as fixed panels of a strongback. That is, the fixed panels 444 may be part of a strongback within the internal cabin 400.

An example of a stowage bin assembly is described in U.S. Pat. No. 9,738,386, entitled "Overhead Stowage Bin Assembly for a Vehicle." It is to be understood, however, that various other types of stowage bin assemblies may be used with respect to embodiments of the present disclosure. The stowage bin assembly 418 shown in FIGS. 12 and 13, as well as those described in U.S. patent application Ser. No. 14/682,217, are merely exemplary.

Figure 14:
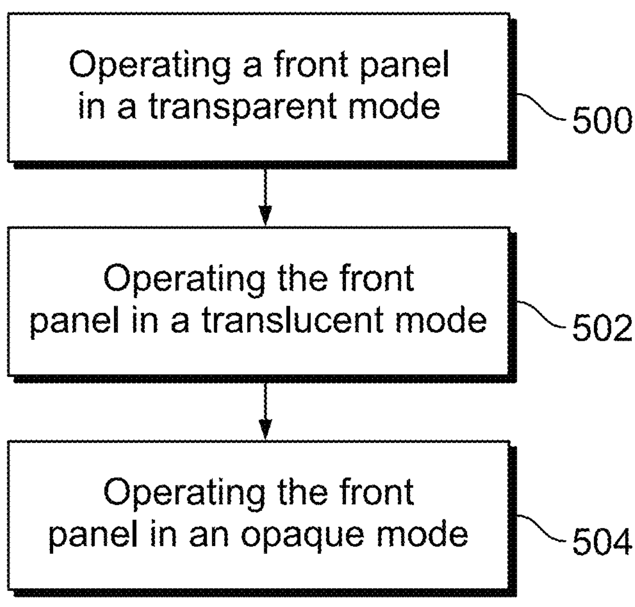
FIG. 14 illustrates a flow chart of a method of operating a stowage bin assembly, according to an embodiment of the present disclosure.

FIG. 14 illustrates a flow chart of a method of operating a stowage bin assembly, according to an embodiment of the present disclosure. As described herein, the method includes selectively switching a front panel between a transparent mode and an opaque mode. In at least one embodiment, the method further includes selectively switching the front panel to a translucent mode.

In at least one embodiment, the method includes, at 500, operating the front panel in a transparent mode. The method further includes, at 502, operating the front panel in a translucent mode. The method further includes, at 504, operating the front panel in an opaque mode.

As described herein, embodiments of the present disclosure provide an improved stowage bin assembly that allows for individuals to view internal contents without opening the stowage bin assembly. Further, embodiments of the present disclosure provide a stowage bin assembly allows boarding times to be reduced. Further, the stowage bin assembly can be operated in a touchless manner, thereby reducing the potential of spreading pathogens. Also, various forms of information can be electronically displayed on the stowage bin assemblies, such as flight data, advertisements, entertainment (for example, shows or movies), and/or the like. For various reasons, embodiments of the present disclosure provide stowage bin assemblies that improve passenger experience.

Further, the disclosure comprises embodiments according to the following clauses:

Clause 1. A stowage bin assembly, comprising:

a front panel configured to be selectively switched between a transparent mode and an opaque mode; and a baggage retaining chamber defined, at least in part, by the front panel, wherein the front panel is moveable between an open position and a closed position.

Clause 2. The stowage bin assembly of Clause 1, wherein the front panel is further configured to be selectively switched to a translucent mode.

Clause 3. The stowage bin assembly of Clauses 1 or 2, further comprising a bucket that includes the front panel.

Clause 4. The stowage bin assembly of Clauses 1 or 2, wherein the front panel is moveably coupled to a bucket.

Clause 5. The stowage bin assembly of any of Clauses 1-4, wherein the front panel comprises an electronic layer, wherein the electronic layer is configured to electronically display information on the front panel.

Clause 6. The stowage bin assembly of any of Clauses 1-5, wherein the front panel comprises a transparent layer, wherein the transparent layer is selectively dimmable between the transparent mode and the opaque mode.

Clause 7. The stowage bin assembly of any of Clauses 1-6, wherein the front panel comprises a protective layer.

Clause 8. The stowage bin assembly of any of Clauses 1-7, wherein the front panel comprises:

an electronic layer, wherein the electronic layer is configured to electronically display information on the front panel;

a transparent layer, wherein the transparent layer is configured to selectively dim the front panel between the transparent mode and the opaque mode; and a protective layer disposed one or both of in front of or behind the electronic layer and the transparent layer.

Clause 9. The stowage bin assembly of any of Clauses 1-8, further comprising a motion sensor that is configured to detect a predetermined gesture that allows the stowage bin assembly to be one or more of locked, unlocked, opened, or closed in a touchless manner.

Clause 10. The stowage bin assembly of any of Clauses 1-9, further comprising a bin control unit that is configured to control the front panel.

Clause 11. The stowage bin assembly of any of Clauses 1-10, further comprising an actuation sub-system operatively coupled to the front panel, wherein the actuation sub-system is configured to automatically move the front panel between an open position and a closed position.

Clause 12. The stowage bin assembly of Clause 11, wherein the actuation sub-system comprises:

a spring configured to exert a spring force into the front panel; and a motor operatively coupled to a spring.

Clause 13. The stowage bin assembly of Clause 12, wherein the actuation sub-system further comprises one or more dampening arms that control motion between the closed position and the open position.

Clause 14. A method of operating a stowage bin assembly, the method comprising:

selectively switching a front panel between a transparent mode and an opaque mode, wherein a baggage retaining chamber is defined, at least in part, by the front panel, and wherein the front panel is moveable between an open position and a closed position.

Clause 15. The method of Clause 14, wherein said selectively switching further comprises selectively switching the front panel to a translucent mode.

Clause 16. The method of Clauses 14 or 15, further comprising:

electronically displaying, by an electronic layer, information on the front panel;

selectively dimming, by a transparent layer, the front panel; and disposing a protective layer one or both of in front of or behind the electronic layer and the transparent layer.

Clause 17. The method of any of Clauses 14-16, further comprising detecting, by a motion sensor, a predetermined gesture that allows the stowage bin assembly to be one or more of locked, unlocked, opened, or closed in a touchless manner.

Clause 18. The method of any of Clauses 14-17, further comprising automatically moving, by an actuation sub-system operatively coupled to the front panel, the front panel between an open position and a closed position.

Clause 19. A vehicle comprising:

an internal cabin; and a stowage bin assembly within the internal cabin, wherein the stowage bin assembly comprises:

a front panel configured to be selectively switched between a transparent mode, a translucent mode, and an opaque mode, wherein the front panel is moveable between an open position and a closed position;

a baggage retaining chamber defined, at least in part, by the front panel;

a motion sensor that is configured to detect a predetermined gesture that allows the stowage bin assembly to be one or more of locked, unlocked, opened, or closed in a touchless manner; and an actuation sub-system operatively coupled to the front panel, wherein the actuation sub-system is configured to automatically move the front panel between an open position and a closed position.

Clause 20. The vehicle of Clause 19, wherein the front panel comprises:

an electronic layer, wherein the electronic layer is configured to electronically display information on the front panel;

a transparent layer, wherein the transparent layer is selectively dimmable between the transparent mode and the opaque mode; and a protective layer disposed one or both of in front of or behind the electronic layer and the transparent layer.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A stowage bin assembly, comprising:

a front panel configured to be selectively switched between a transparent mode and an opaque mode, wherein the front panel comprises an electronic layer, wherein the electronic layer is configured to electronically display electronic information on the front panel, and wherein the electronic information comprises one or more of text, graphics, or video; and a baggage retaining chamber, wherein the front panel is moveable between an open position and a closed position.

2. The stowage bin assembly of claim 1, wherein the front panel is further configured to be selectively switched to a translucent mode.

3. The stowage bin assembly of claim 1, further comprising a bucket that includes the front panel.

4. The stowage bin assembly of claim 1, wherein the front panel is moveably coupled to a bucket.

5. The stowage bin assembly of claim 1, wherein the front panel comprises a transparent layer, and wherein the transparent layer is selectively dimmable between the transparent mode and the opaque mode.

6. The stowage bin assembly of claim 5, wherein the transparent layer is adjustably dimmable at various levels between, but not including, the transparent mode and the opaque mode.

7. The stowage bin assembly of claim 1, wherein the front panel comprises a protective layer.

8. The stowage bin assembly of claim 1, wherein during one or more phases of flight, the electronic layer is configured to electronically display various electronic information on the front panel that includes food and beverage items, safety information, and one or more flight parameters, and wherein the front panel further comprises:

a transparent layer, wherein the transparent layer is configured to selectively dim the front panel between the transparent mode and the opaque mode; and a protective layer disposed in front of or behind the electronic layer and the transparent layer.

9. The stowage bin assembly of claim 1, further comprising a motion sensor that is configured to detect a predetermined gesture that allows the stowage bin assembly to be one or more of locked, unlocked, opened, or closed in a touchless manner.

10. The stowage bin assembly of claim 1, further comprising a bin control unit that is configured to control the front panel.

11. The stowage bin assembly of claim 1, further comprising an actuation sub-system operatively coupled to the front panel, and wherein the actuation sub-system is configured to automatically move the front panel between an open position and a closed position.

12. The stowage bin assembly of claim 11, wherein the actuation sub-system comprises:

a spring configured to exert a spring force into the front panel; and a motor operatively coupled to a spring.

13. The stowage bin assembly of claim 12, wherein the actuation sub-system further comprises one or more dampening arms that control motion between the closed position and the open position.

14. The stowage bin assembly of claim 1, wherein the electronic information comprises the text, the graphics, and the video.

15. A method of operating a stowage bin assembly, the method comprising:

selectively switching a front panel between a transparent mode and an opaque mode; and electronically displaying, by an electronic layer, electronic information on the front panel, wherein the electronic information comprises one or more of text, graphics, or video.

16. The method of claim 15, wherein said selectively switching further comprises selectively switching the front panel to a translucent mode.

17. The method of claim 15, further comprising:

electronically displaying, by an electronic layer, various electronic information on the front panel during one or more phases of flight, that includes available food and beverage items, safety information, and one or more flight parameters;

selectively dimming, by a transparent layer, the front panel; and disposing a protective layer in front of or behind the electronic layer and the transparent layer.

18. The method of claim 15, further comprising detecting, by a motion sensor, a predetermined gesture that allows the stowage bin assembly to be one or more of locked, unlocked, opened, or closed in a touchless manner.

19. The method of claim 15, further comprising automatically moving, by an actuation sub-system operatively coupled to the front panel, the front panel between an open position and a closed position.

20. A vehicle comprising:

an internal cabin; and a stowage bin assembly within the internal cabin, wherein the stowage bin assembly comprises:

a front panel configured to be selectively switched between a transparent mode, a translucent mode, and an opaque mode, wherein the front panel is moveable between an open position and a closed position, wherein the front panel comprises an electronic layer, wherein the electronic layer is configured to electronically display electronic information on the front panel, and wherein the electronic information comprises one or more of text, graphics, or video;

a baggage retaining chamber defined, at least in part, by the front panel;

a motion sensor that is configured to detect a predetermined gesture that allows the stowage bin assembly to be one or more of locked, unlocked, opened, or closed in a touchless manner; and an actuation sub-system operatively coupled to the front panel, wherein the actuation sub-system is configured to automatically move the front panel between an open position and a closed position.

21. The vehicle of claim 20, wherein the front panel further comprises:

a transparent layer, wherein the transparent layer is selectively dimmable between the transparent mode and the opaque mode; and a protective layer disposed in front of or behind the electronic layer and the transparent layer.

* * * * *